(12) United States Patent
Geier (10) Patent No.: US 7,481,024 B1
(45) Date of Patent: Jan. 27, 2009

(54) APPARATUS FOR PLACING SOIL INTO CELLS

(76) Inventor: Ralph H. Geier, 805 N. School Rd., Apt. 105, Hutchinson, MN (US) 55350

( * ) Notice: Subject to any disclaimer, the term of this patent is extended or adjusted under 35 U.S.C. 154(b) by 133 days.

(21) Appl. No.: 10/369,485

(22) Filed: Feb. 20, 2003

(51) Int. Cl.
  *A01G 9/10* (2006.01)
(52) U.S. Cl. .................................................. 47/1.01 P
(58) Field of Classification Search ............. 47/1.01 R, 47/65.9, 1.01 P, 65.5, 73, 77, 66.5, 85–87; 111/104, 105, 199, 200, 900
  See application file for complete search history.

(56) References Cited

U.S. PATENT DOCUMENTS

| | | | | |
|---|---|---|---|---|
| 3,719,158 A | * | 3/1973 | Roths | 111/105 |
| 3,757,468 A | * | 9/1973 | Shirouzu | 47/85 |
| 4,253,411 A | * | 3/1981 | Shulzhenko et al. | 111/105 |
| 4,341,333 A | * | 7/1982 | Boa et al. | 225/96 |
| 4,395,846 A | * | 8/1983 | Gjertz et al. | 47/86 |
| 4,517,764 A | * | 5/1985 | Dedolph | 47/77 |
| 5,088,231 A | * | 2/1992 | Kertz | 47/1.01 R |
| 5,207,020 A | * | 5/1993 | Aslam et al. | 47/9 |
| 5,215,408 A | * | 6/1993 | Zimmerman | 405/129.8 |
| 5,573,558 A | * | 11/1996 | Huang | 47/1.01 R |
| 5,653,055 A | * | 8/1997 | Sunaga et al. | 47/66.5 |

OTHER PUBLICATIONS www.dictionary.com, definition of "weave".*
www.dictionary.com, definition of "weave", Sep. 9, 2008.*

* cited by examiner

*Primary Examiner*—Son T. Nguyen (57) ABSTRACT

An apparatus for placing soil into cells has a table, biodegradable tape, a means to weave the tape forming cells, and a means to fill the cells. The weaving means has pins, boards, handles, a baseplate, a lever and a lock, a shaft and a means to mount the shaft, rollers, and clamps. The filling means has a filler, a pressure source, rails, an extruder, and a bin. In use, rolls of tape thread through a roller, pins and a clamp. Pulling the handles together forms the tape into cells to accept soil from the filling means.

15 Claims, 9 Drawing Sheets

APPARATUS FOR PLACING SOIL INTO CELLS

BACKGROUND OF THE INVENTION

1. Field of the Invention

The present invention relates to an apparatus for placing soil into cells for use in connection with transplanting crops. The apparatus for placing soil into cells has particular utility in connection with weaving tape into a grid of cells.

2. Description of the Prior Art

An apparatus for placing soil into cells is desirable for agriculture, particularly in preparation for planting. Modern agriculture calls for the most crops per acre grown in the shortest time to maximize yields. Before reaching a kitchen, salads and vegetables start as seeds. Seeds in a field take time to germinate and sprout while exposed to insect and environmental risks. Saving time and reducing risk, modern agriculture starts vegetables in trays within a greenhouse. The vegetables occupy one-inch square cells up to two inches deep arrayed in trays. The vegetables grow in a greenhouse during the last stages of winter. Within a week of seeding, vegetables form roots strong enough for transplanting. Once the vegetables reach a vibrant seedling stage, a grower takes the seedlings from the greenhouse and transplants them into a field as soon as weather allows. Typically, the vegetables are transplanted from their cells and trays by manual or mechanized methods. The cells and trays remain behind as waste and cause additional expense in collecting them from the field.

The use of planting systems is known in the prior art. For example, U.S. Pat. No. 6,092,331 to Stoever discloses a planting container and method of making the container. However, the Stoever '331 patent does not weave tape into a grid of cells, and has further drawbacks of coiling for stability and reinforcement for durability.

U.S. Pat. No. 5,653,055 to Sunaga et al. discloses a continuously assembled set of pots for planting and transplanting seedlings. However, the Sunaga '055 patent does not form pots by weaving, and additionally does not avoid use of an adhesive.

Similarly, U.S. Pat. No. 5,573,558 to Huang discloses an automatic transplanting system that transfers seedlings from a tray to larger pots or a field. However, the Huang '558 patent does not fill cells by the tray with soil, and cannot weave tape into a grid.

Similarly, U.S. Pat. No. 4,422,990 to Armstrong et al. discloses a method and apparatus for making soil plugs. However, the Armstrong '990 patent does not form individual cells but rather whole trays, does not weave tape, and cannot mold soil without a binding resin.

Similarly, U.S. Pat. No. 4,777,763 to Shannon et al. discloses a plant growing medium made of scored fiberglass. However, the Shannon '763 patent does not use tape woven into cells, and cannot carry soil within the fibers.

While the above-described devices fulfill their respective, particular objectives and requirements, the aforementioned patents do not describe an apparatus for placing soil into cells that allows weaving tape into a grid of cells. The Stoever '331 and Sunaga '055 patents make no provision for weaving tapes into cells. The Huang '558 patent does not fill individual cells with soil. The Armstrong '990 patent makes no provision for molding soil alone. The Shannon '763 patent makes no provision for using tape.

Therefore, a need exists for a new and improved apparatus for placing soil into cells that can be used for weaving tape into a grid of cells. In this regard, the present invention substantially fulfills this need. In this respect, the apparatus for placing soil into cells according to the present invention substantially departs from the conventional concepts and designs of the prior art, and in doing so provides an apparatus primarily developed for the purpose of weaving tape into a grid of cells.

SUMMARY OF THE INVENTION

In view of the foregoing disadvantages inherent in the known types of planting systems now present in the prior art, the present invention provides an improved apparatus for placing soil into cells, and overcomes the above-mentioned disadvantages and drawbacks of the prior art. As such, the general purpose of the present invention, which will be described subsequently in greater detail, is to provide a new and improved apparatus for placing soil into cells and method which has all the advantages of the prior art mentioned heretofore and many novel features that result in a apparatus for placing soil into cells which is not anticipated, rendered obvious, suggested, or even implied by the prior art, either alone or in any combination thereof.

To attain this, the present invention essentially comprises an apparatus for placing soil into cells that has a table with corners and legs, rolls of biodegradable tape, a means to weave the tape into a grid to form cells, and, a means to fill the cells with soil whereby the filled cells await seed implantation. The weaving means has weaving pins, perpendicular to the table, opposite the legs, and arranged in rows; weaving boards inlaid into the table; two handles attached to one end of the weaving boards where the handles join each weaving board individually; a baseplate beneath the weaving boards upon which the weaving pins rest; a lever to raise and lower the baseplate; a lock that serves as a fulcrum and secures the lever; a shaft, parallel to the longitudinal axis of the table; a means to mount the shaft upon the table; two or more rollers; and, two or more clamps, opposite the shaft. The filling means has these parts: a filler, a pressure source, a pair of mutually parallel rails, an extruder, and, a bin attached to the extruder for receiving soil. In working the apparatus, the rolls of tape: install upon the shaft, the tape unrolls, passes the roller, then feeds through the pins and secures to the clamp; and each roll of tape runs through one roller, one row of pins and one clamp. With two or more rolls of tape threaded through the weaving pins, pulling the handles together bends the tape to form cells joined into a grid. The filling means receives soil from the bin, moves over the cells, and ejects the soil into the cells. There has thus been outlined, rather broadly, the more important features of the invention in order that the detailed description thereof that follows may be better understood and in order that the present contribution to the art may be better appreciated.

The invention may also include pins located on the edges of the boards and offset from pins on adjacent boards, boards alternating in position, handles that control half of the boards, a lever to raise, lower, and secure a baseplate beneath the pins, a shaft mounted on brackets or leg holes, a rectangular filler with upper and lower chambers, the upper chamber has a bladder and pressure plate and the lower chamber has a flap to move filled cells, and an extruder to advance soil mechanically. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved apparatus for placing soil into cells that has all of the advantages of the prior art planting systems and none of the disadvantages.

It is another object of the present invention to provide a new and improved apparatus for placing soil into cells that may be easily and efficiently manufactured and marketed.

An even further object of the present invention is to provide a new and improved apparatus for placing soil into cells that has a low cost of manufacture with regard to both materials and labor, and which accordingly is then susceptible of low prices of sale to the consuming public, thereby making such apparatus for placing soil into cells economically available to the buying public.

Still another object of the present invention is to provide a new apparatus for placing soil into cells that provides in the apparatuses and methods of the prior art some of the advantages thereof, while simultaneously overcoming some of the disadvantages normally associated therewith.

Even still another object of the present invention is to provide an apparatus for placing soil into cells for weaving tape into a grid of cells. This allows rapid assembly of trays and insertion of soil.

Still yet another object of the present invention is to provide an apparatus for placing soil into cells for weaving tape into a grid of cells. This makes it possible to leave the cell in the ground.

Still yet another object of the present invention is to provide an apparatus for placing soil into cells for weaving tape into a grid of cells. This makes it possible to transplant more seedlings at lower cost.

Lastly, it is an object of the present invention to provide a new and improved method of forming cells and then filling said cells with soil. The method follows these steps: 1) extending two or more rolls of tape through weaving pins upon weaving boards, 2) aligning the weaving boards together thus forming the tape into cells, 3) admitting soil into a filler. 4) positioning the filler over the cells, 5) pressurizing the filler to eject soil into the cells, 6) lowering the pins and cutting the tape to release the cells, and 7) moving the cells off the weaving boards while under the filler.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1-9, a preferred embodiment of the apparatus for placing soil into cells of the present invention is shown and generally designated by the reference numeral 10.

Figure 1:
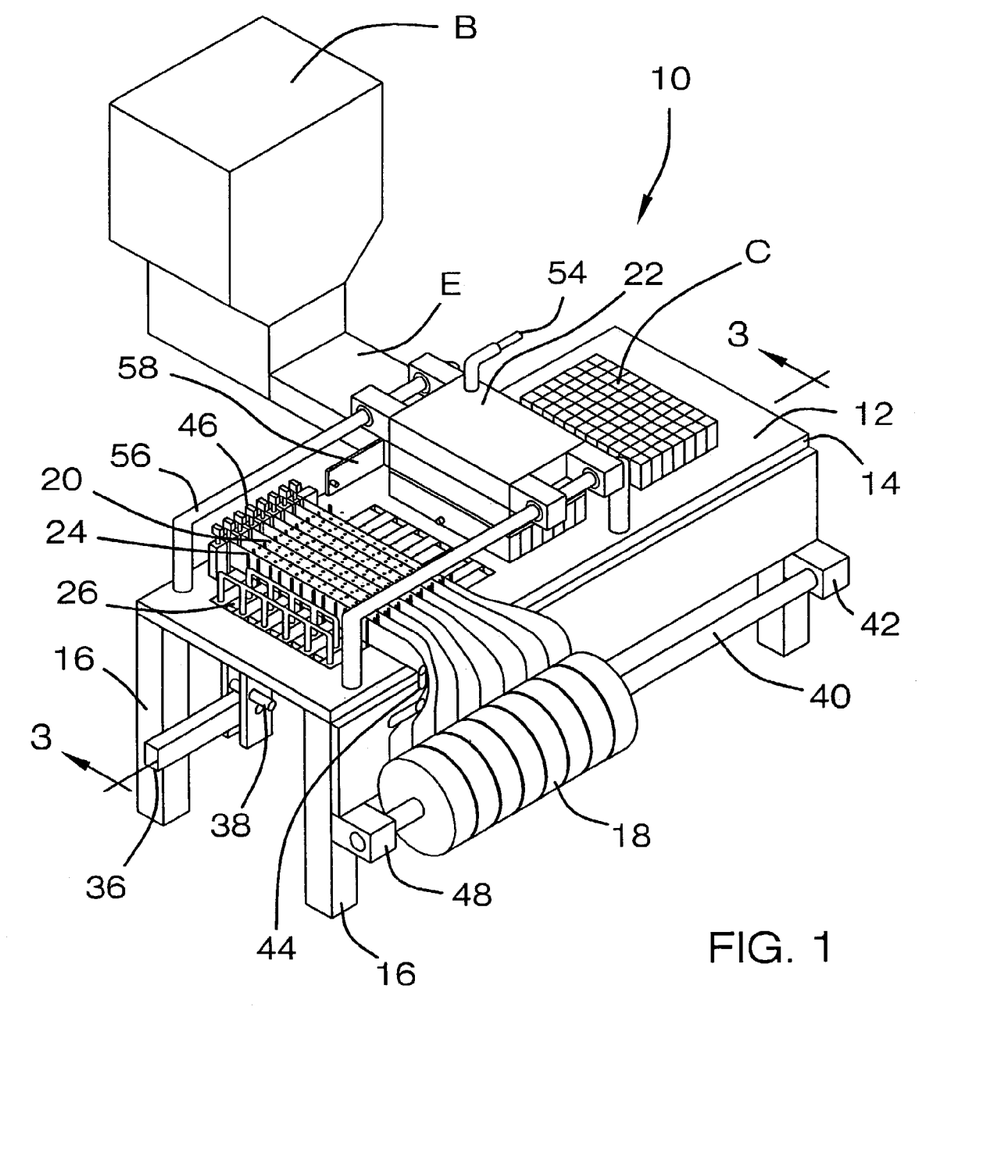
FIG. 1 is an isometric view of the preferred embodiment of the apparatus for placing soil into cells constructed in accordance with the principles of the present invention and showing the weaving of tape into cells.

In FIG. 1, a new and improved apparatus for placing soil into cells 10 of the present invention for weaving tape into a grid of cells is illustrated and will be described. More particularly, the apparatus for placing soil into cells 10 has a table 12, two or more rolls of biodegradable tape 18, a means to weave the tape 18 into a grid 72 of cells C, and a means to fill the cells C with soil S. The filled cells C then await seed implantation. The table 12 has a generally rectangular shape having corners 14 and parallel legs 16. The legs 16 descend perpendicular to the plane of the table 12 proximate to each corner 14. A biodegradable plastic has recently entered the market and is suitable 12 for tape 18 form. The tape 18 has an approximate two inch width and withstands bending in excess of ninety degrees. The weaving means 20 receives the tape 18 in lines and then bends the lines of tape 18 into a grid forming cells C. The filling means 22 loads soil S then locates itself above empty cells C, and then fills the cells C with soil S. Following filling, the filling means 22 moves the filled cells C away from the weaving means 20. The filled cells C rest upon a flat tray where a grower then places seeds into the cells C.

Figure 2:
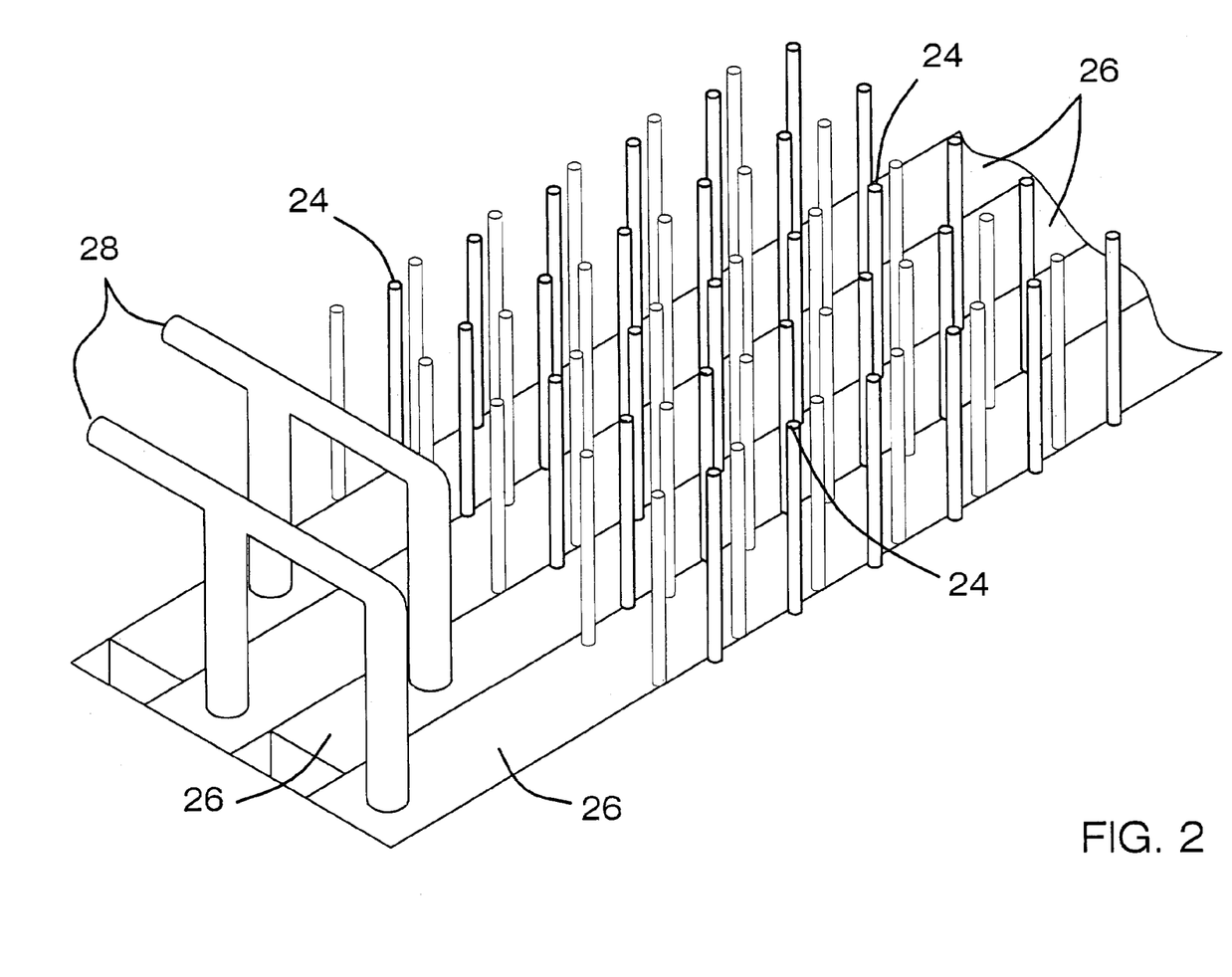
FIG. 2 is a detailed view of the weaving pins on the weaving boards of the apparatus for placing soil into cells of the present invention.

Looking more closely at FIGS. 1 & 2, the weaving means 20 of the apparatus 10 has weaving pins 24 upon weaving boards 26 positioned by handles 28. The weaving pins 24 have a generally cylindrical shape with a length in excess of two diameters to appear slender. The weaving pins 24 extend perpendicular to the plane of the table 12 and opposite the legs 16. Arranged in rows, the steel weaving pins 24 extend and retract between the weaving boards 26. FIG. 2 shows the pins 24 in the extended position, above the table 12. The wooden weaving boards 26 have a narrow rectangular shape that defines the width of the cells C. Of the same length, adjacent weaving boards 26 have a position offset one cell C width towards the center of the table 12. Near the end of the weaving boards 26 away from the center of the table 12, two handles 28 join each weaving board 26 individually. The handles 28 are perpendicular to the table 12. One handle 28 joins the weaving boards 26 advanced towards the center of the table 12, and the other handle 28 joins the adjacent weaving boards 26 away from the center of the table 12 as shown in FIG. 2. Outside of the weaving means 20 in FIG. 1, a lever 36 extends from beneath the weaving boards 26 to outside of the legs 16 parallel with the longitudinal axis of the table 12. A lock 38 descends from the perimeter of the table 12 and serves as the fulcrum F for the lever 36. Further, the lock 38 secures the lever 36 in one of two positions: raised and lowered. A shaft 40, generally cylindrical, runs alongside a pair of legs 16 and parallel with the longitudinal axis of the table 12. Means to mount 42 the shaft 40 join the shaft 40 to the table 12 while permitting installation of rolls of tape 18. In the preferred embodiment, the mounting means 42 are steel brackets 48 with a central hole to permit rotation of the shaft 40. In an alternate embodiment, the mounting means 42 is a pair of holes 50 in a pair of opposite legs 16 where the ends of the shaft 40 fit within the holes 50. Above the shaft 40, two or more rollers 44 form a gang along the perimeter of the table 12 on the same side as the shaft 40. Opposite the rollers 44, two or more clamps 46 form a gang along the table 12 on the opposite side as the shaft 40 that matches the rollers 44. The rolls of tape 18 install upon the shaft 40, each line of tape 18 unrolls and passes a roller 44 then feeds through a row of pins 24 and secures to a clamp 46.

Figure 3:
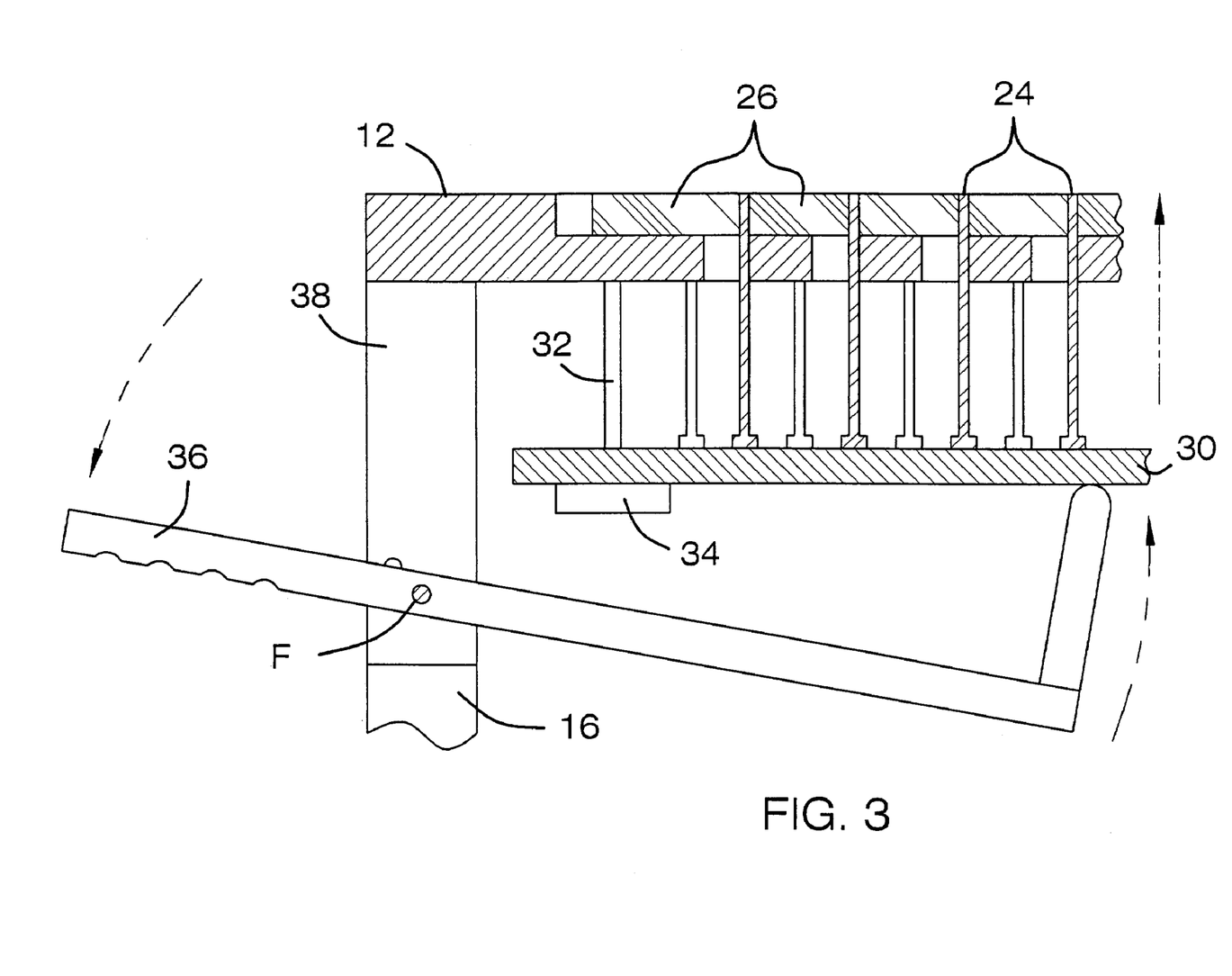
FIG. 3 is a section view of the lever and baseplate of the apparatus for placing soil into cells of the present invention.

Beneath FIG. 2, FIG. 3 reveals how the weaving pins 24 raise and lower. Passing alongside adjacent boards 26, the pins move through the table 12 and rest upon a baseplate 30. The pins 24 have a wide head that slides upon the baseplate 30 as the weaving boards 26 move. The baseplate 30 changes elevation from a lowered to a raised position by following a steel guide rod 32. The baseplate 30 reaches the raised position when the baseplate 30 contacts the underside of the table 12. The baseplate 30 rests in the lowered position when the baseplate 30 reaches the steel stop 34 at the end of the steel guide rod 32, away from the table 12. With the baseplate 30 in the lowered position, the weaving pins 24 are retracted from the table 12. The lever 36 contacts the underside of the baseplate 30, extends to a fulcrum F in the lock 38, and reaches beyond the legs 16 for grasping by a grower. A grower, pushing the lever 36 downwards, raises the baseplate 30 and extends the weaving pins 24 to that position shown in FIGS. 1 & 2. The weaving pins 24 remain raised by placing a locking pin above the lever 36 within the lock 38 to prevent the lever 36 from rotating.

Figure 4:
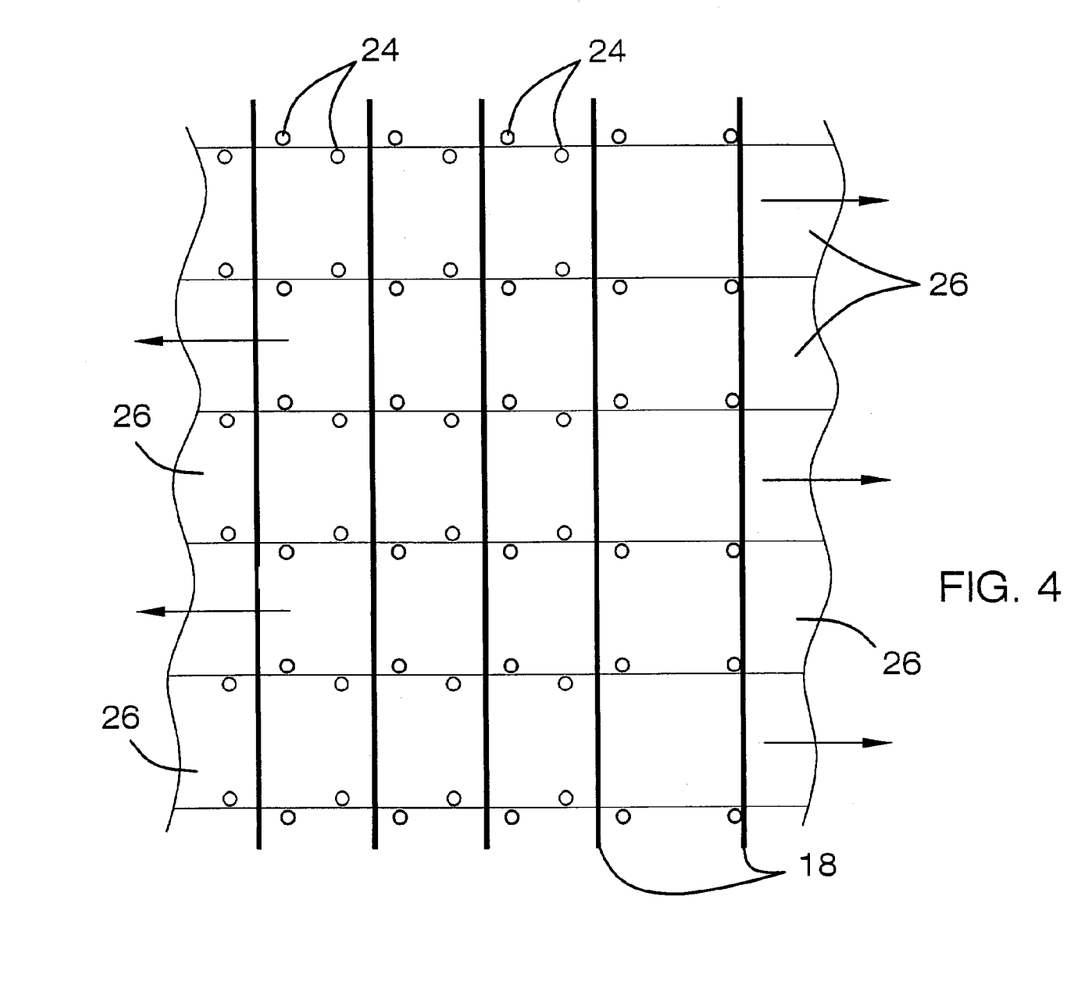
FIG. 4 is a plan view of tape ran through pins before weaving of the apparatus for placing soil into cells of the present invention.
Figure 5:
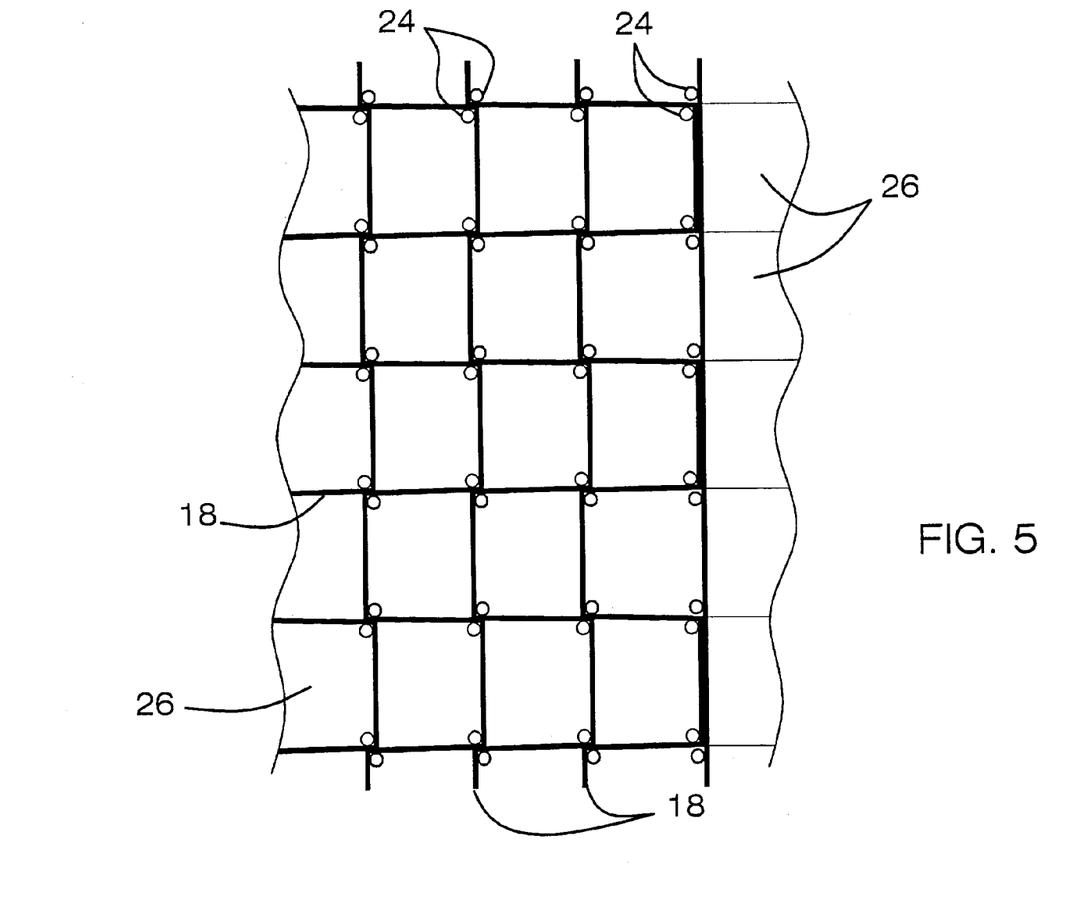
FIG. 5 is a plan view of tape ran through pins after weaving of the apparatus for placing soil into cells of the present invention.
Figure 6:
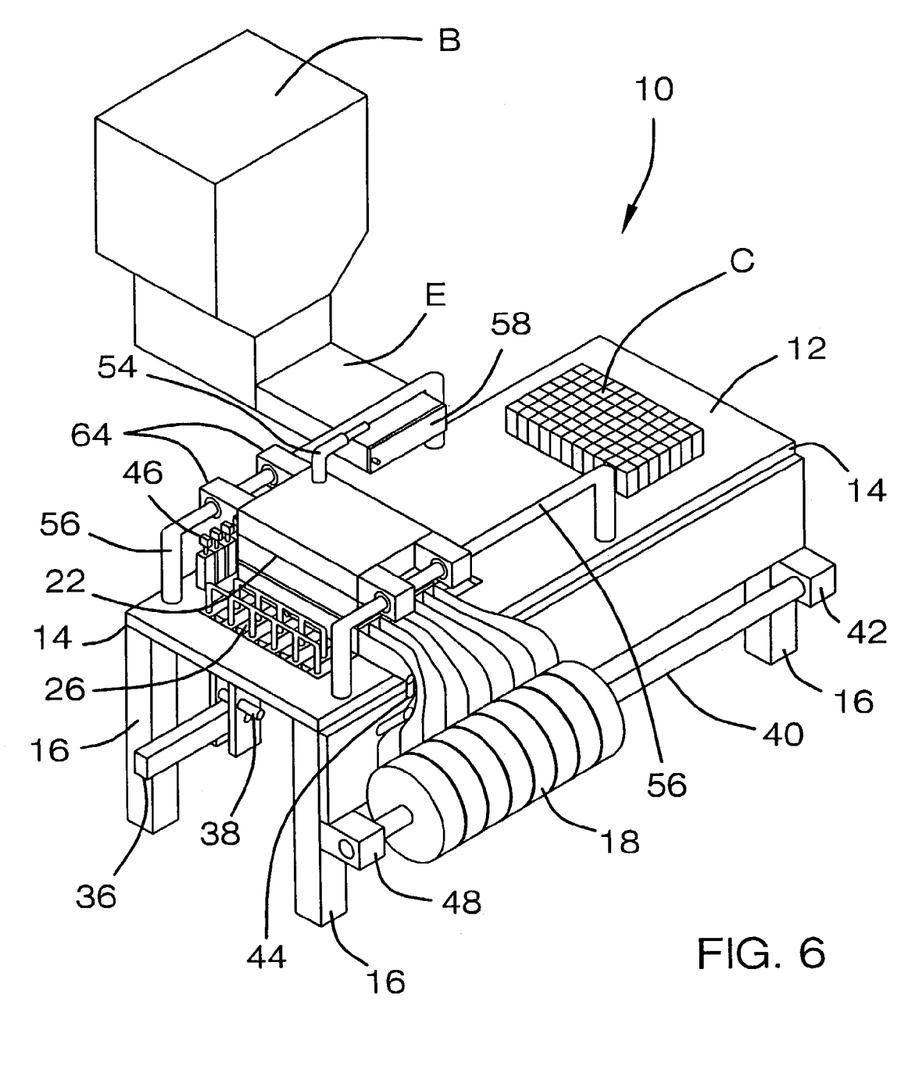
FIG. 6 is an isometric view of the preferred embodiment of the apparatus for placing soil into cells of the present invention and showing the filling soil into cells.

Turning to FIG. 4, parallel tapes 18 extend from rolls and pass through rows of pins 24 to the clamps 46 before weaving. The pins 24 of adjacent boards 26 have an offset equal to a cell C width. A grower would then bring the handles 28 together, moving the weaving boards 26 and the tape 18. Next, in FIG. 5, the bent tapes 18 form cells C in a grid pattern. The pins 24 on adjacent boards 26 now cluster in the corners 14 of cells C after weaving. The grid 72 of empty cells C awaits filling.

With cells C woven, a grower loads the filling means 22 with soil S in FIG. 1. Stored in a bin B, the soil S drops to the extruder F where a mechanism (not shown) advances the soil S into the filling means 22. The grower closes a door 58 on the extruder E then slides the loaded filling means 22 along a pair of rails 56. The steel rails 56 are mutually parallel, located near the perimeter of the table 12, and parallel to the longitudinal axis of the table 12. The rails 56 generally extend from the center of the table 12 toward the lever 36. The rails 56 have down turned ends that attach to the table 12. After moving along the rails 56, the filling means 22 takes position above the grid of empty cells C in FIG. 6.

Figure 7:
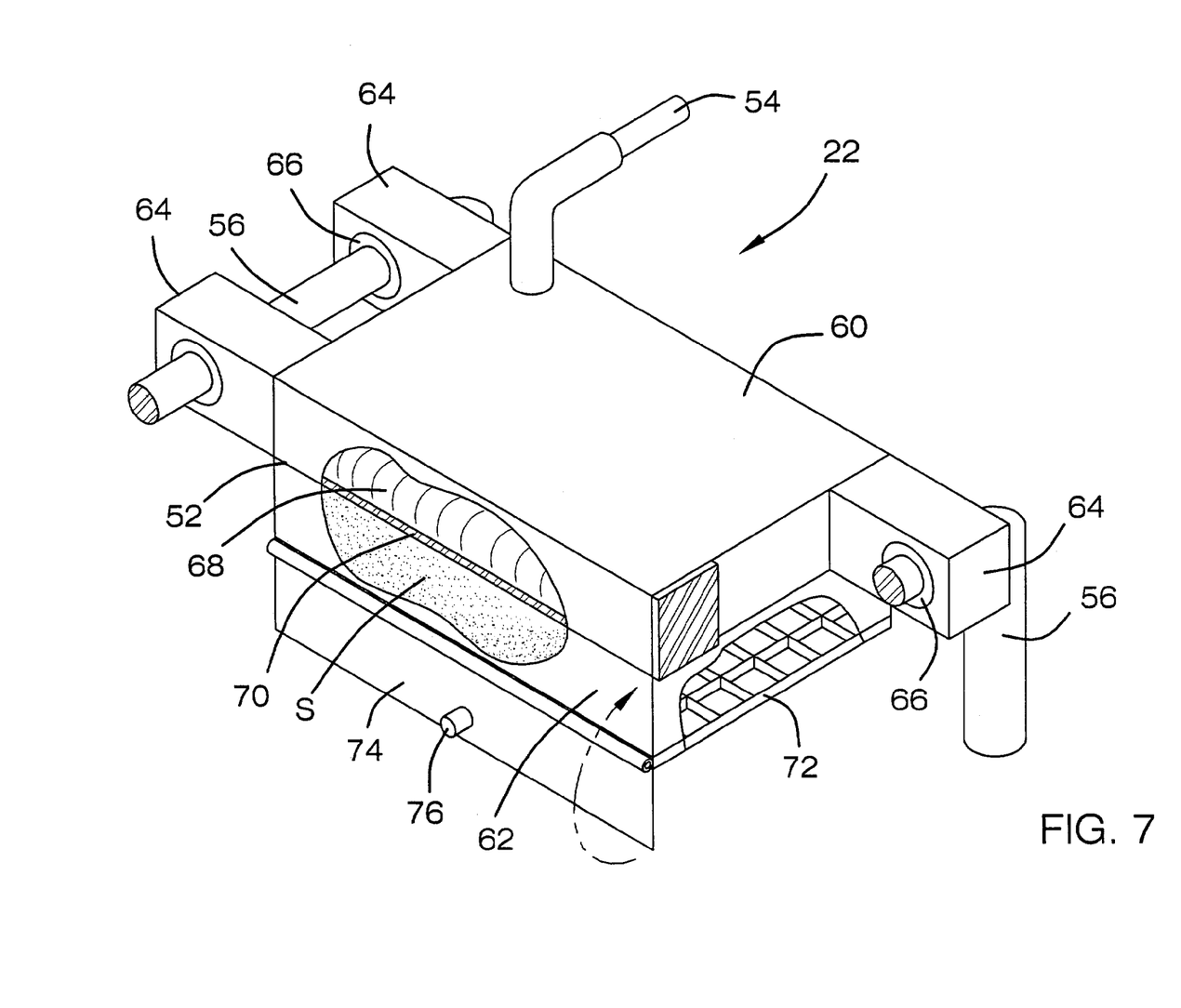
FIG. 7 is a detailed view of the filling means of the apparatus for placing soil into cells of the present invention.

FIG. 7 shows the filling means 22 used in the apparatus 10. The filling means 22 has a filler 52 and a pressure source 54. The hollow steel filler 52 has a generally rectangular shape with the longitudinal axis perpendicular to the longitudinal axis of said table 12, a steel upper chamber 60, and a steel lower chamber 60 opposite the upper chamber 60 and closer to the table 12. The upper chamber 60 has two or more supports 64 extending parallel to the longitudinal axis of the filler 52. The supports 64 have a linear bearing 66 to permit movement of the filler 52 along the rails 56. In the preferred embodiment, four supports 64 extend from the upper chamber 60 in two opposing pairs with the supports 64 parallel to the longitudinal axis of the filler 52. In alternate embodiment, two supports 64 extend from the upper chamber 60 in an opposing pairs with the supports 64 parallel to the longitudinal axis of the filler 52. The linear bearing 66s, contained within the supports 64, surround the rails 56. Then the upper chamber 60 contains a bladder 68 and beneath the bladder 68, a pressure plate 70. The steel pressure plate 70 fits snugly within the upper chamber 60.

Beneath the upper chamber 60, the lower chamber 60 has a grid 72 and a flap 74. The grid 72 forms the lower surface of the lower chamber 60 closer to the table 12 and matches the desired cell C pattern. The flap 74 extends the width of the lower chamber 60 and has a hinged connection to the lower chamber 60 along the side of the grid 72 toward the lever 36. A knob 76 on the flap 74 permits a grower to grasp the flap 74.

The pressure source 54 joins the upper chamber 60 and when energized, fills the bladder 68. The bladder 68 expands and moves the pressure plate 70 through the depth of the lower chamber 60, ejecting the soil S within the lower chamber 60 through the grid 72 into the cells C below. The pressure source 54 provides an intermittent impulse to eject soil S from the upper chamber 60 and into the cells C. In the preferred embodiment, the pressure source 54 is compressed air that fills a flexible rubber bladder 68. In an alternate embodiment, the pressure source 54 is hydraulic fluid that activates a cylinder. In a still further embodiment, the pressure source 54 is a mechanism to eject the soil S manually.

Figure 8:
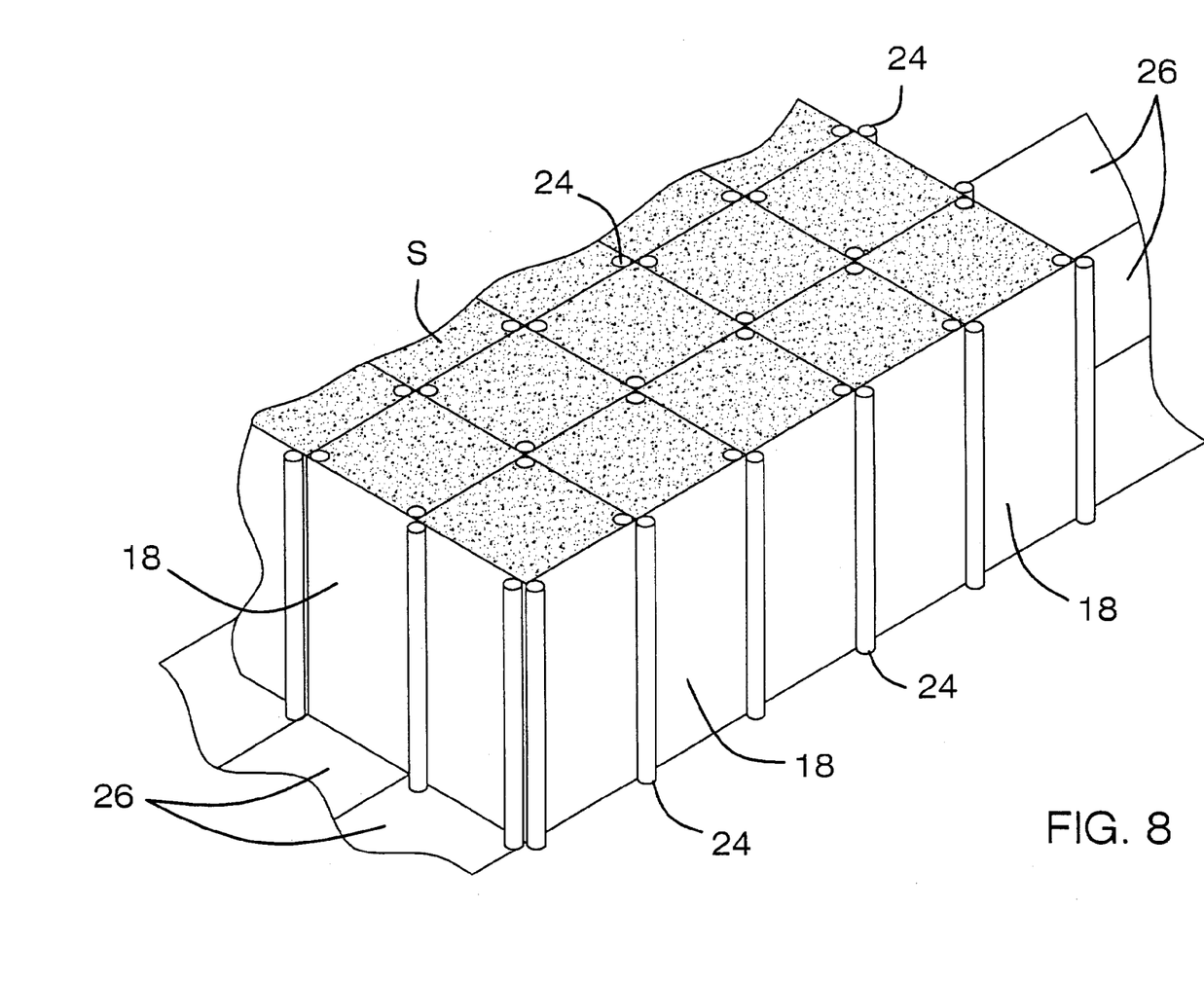
FIG. 8 is a detailed view of the cells filled with soil with extended pins of the apparatus for placing soil into cells of the present invention.
Figure 9:
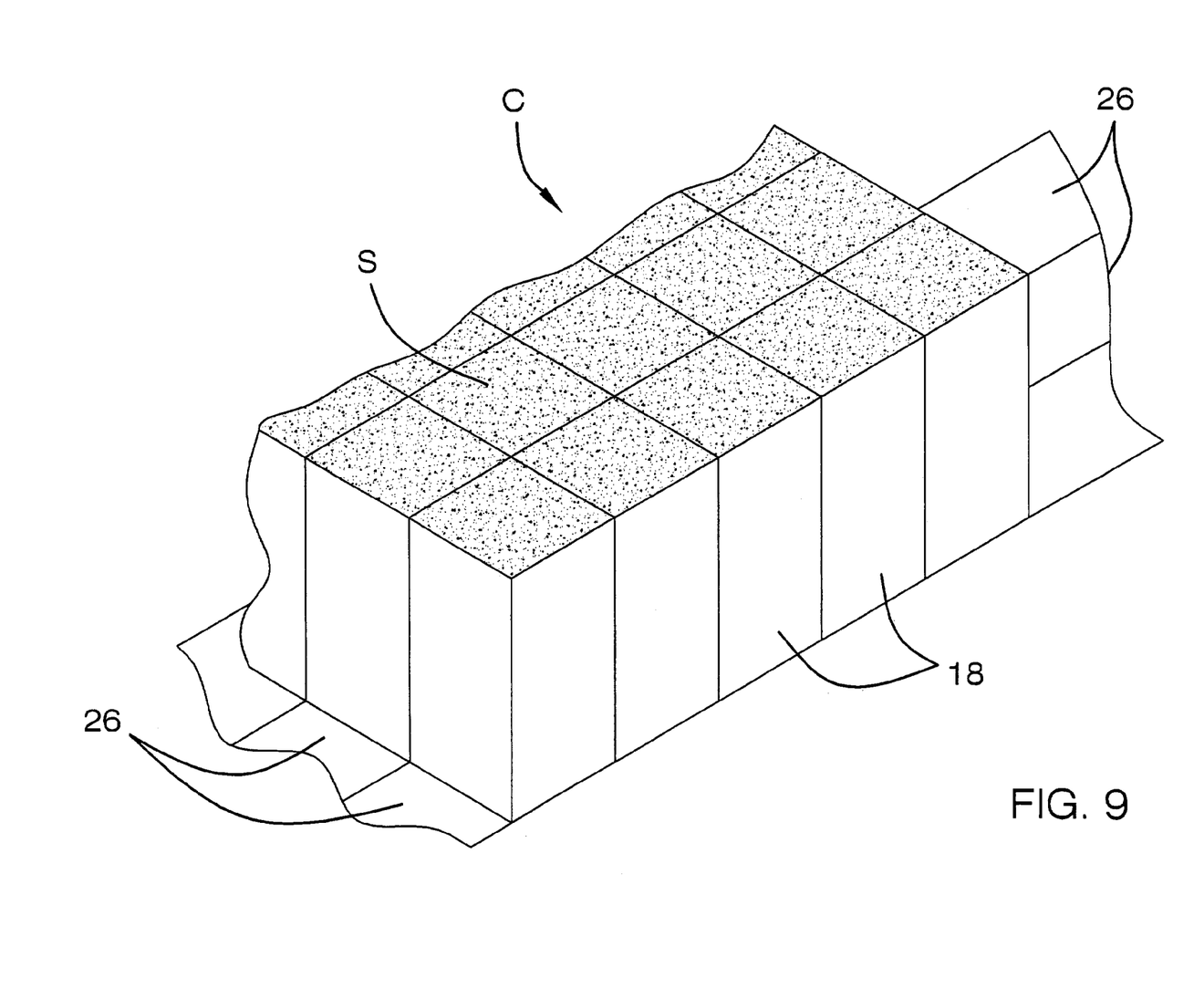
FIG. 9 is a detailed view of the cells filled with soil with retracted pins of the apparatus for placing soil into cells of the present invention.

Lastly, turning to FIG. 8, after the energizing the pressure source 54, the soil S fills the cells C evenly. The weaving pins 24 remain extended during and after the filling of the cells C. The tape 18 forms the cells C between the pins. Unlocking the lever 36, a grower lowers the baseplate 30 and the pins to free the cells C shown in FIG. 9. The full cells C may now slide off the weaving board by pushing the knob 76 and the flap 74 along the cells C.

In use, it can now be understood that a grower places rolls of biodegradable tape 18 upon a shaft 40 attached to a table 12. The grower presses the lever 36 to extend the weaving pins 24, then pulls the tape 18 past roller 44s and through rows of weaving pins 24. With the tape 18 forming parallel lines through weaving pins 24 and across alternating weaving boards 26, the tape 18 secures to clamps 46 opposite the shaft 40. The grower then closes two handles 28 together, clustering the weaving pins 24, and forming the tape 18 into a grid of cells C. A grower then loads the upper chamber 60 of a filler 52 with soil S extruded from a bin B. After closing the door 58 on the extruder E and lifting the knob 76, the grower slides the filler 52 along the rails 56. The filler 52 comes to rest with the lower chamber 60 above the grid of cells C. The grower then energizes the pressure source 54 to eject soil S from the filler 52 into the cells C. To release the cells C, the grower cuts the tape 18 adjacent to the cells C and towards the rolls of tape 18. Upon lowering the flap 74 alongside the cells C, the grower moves the filler 52 and filled cells C away from the weaving board. The grower repeats this cycle for additional grids of cells C.

While a preferred embodiment of the apparatus for placing soil into cells has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as aluminum, plastic, nylon, metal alloy, or a variety of wood may be used instead of the steel weaving pins described. Also, the weaving boards may be made of heavy-duty plastic, metal, or similar material. Although weaving tape into a grid of cells has been described, it should be appreciated that the apparatus for placing soil into cells herein described is also suitable for culinary uses. Furthermore, a wide variety of filling substances may be used instead of the soil described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for placing soil into cells, comprising:
   a table, generally rectangular in shape having corners and parallel legs descending perpendicular to the plane of said table from each of said corners;
   two or more rolls of biodegradable tape;
   a means to weave said tape into a grid of said cells wherein said weaving means comprises:
   weaving pins, generally cylindrical in shape with a length of two or more diameters, extending perpendicular to the plane of said table and opposite said legs;
   weaving boards, rectangular in shape and inlaid into said table, said weaving boards define the width of said cells;
   two handles attached to one end of said weaving boards, said handles joining each weaving board individually;
   a baseplate beneath said weaving boards upon which said weaving pins rest, said baseplate ascends and descends along a guide rod and a stop denotes the lowest elevation of said baseplate;
   a lever, beneath said baseplate, spanning from near the center of said table to beyond said table with the longitudinal axis of said lever parallel with the longitudinal axis of said table;
   a lock, descending at the perimeter of said table, whereby said lock serves as a fulcrum and secures said lever;
   a shaft, cylindrical in shape with the longitudinal axis of said shaft parallel with the longitudinal axis of said table;
   a means to mount said shaft upon said table;
   two or more rollers, located in a gang along said table on the same side as said shaft; and,
   two or more clamps, located in a gang along said table on the opposite side as said shaft,
   whereby said rolls of tape install upon said shaft, said tape unrolls and passes said roller then feeds through said pins and secures to said clamp, each tape runs through one roller, one row of pins and one clamp; and,
   a means to fill said cells with soil whereby the filled cells then stand ready for seed implantation.

2. The apparatus of claim 1 wherein said weaving pins are recessed from the longitudinal edges of said weaving boards.

3. The apparatus of claim 1 wherein adjacent weaving boards have said weaving pins offset, said handles join alternate weaving boards whereby each handle controls half of said weaving boards, and one handle is closer to the center of said table than the other handle.

4. The apparatus of claim 3 wherein closing one handle to the other handle brings said pins of adjacent boards together whereby said tape between said pins deflects to form a grid.

5. The apparatus of claim 1 wherein said lever rotates about said fulcrum raising and lowering said baseplate thus extending and retracting said weaving pins from said weaving board, and said lock secures said lever in either the extended or the retracted positions.

6. The apparatus of claim 1 further comprising: said mounting means having
   a pair of brackets joined to a pair of said legs, each bracket accepts an end of said shaft, whereby said shaft spans between said brackets parallel to the longitudinal axis of said table and said shaft rotates to unroll said tape.

7. The apparatus of claim 1 wherein said mounting means is a pair of opposite holes in a pair of said legs whereby said shaft spans between said legs parallel to the longitudinal axis of said table and said shaft rotates to unroll said tape.

8. The apparatus of claim 1 wherein said pins are selected from the group aluminum, steel, and heavy-duty plastic.

9. The apparatus of claim 1 further comprising: said filling means having
   a filler;
   a pressure source;
   a pair of mutually parallel rails, said rails being parallel to the longitudinal axis of said table, along the perimeter of said table, and above said table, said rails extend from the interior of said table and to beyond said weaving boards;
   an extruder, extends from said filler, having a door between said extruder and said filler; and,
   a bin attached to said extruder for receiving soil, said extruder joins said bin proximate to the lower end of said bin.

10. The apparatus of claim 9 wherein said filler has a generally rectangular shape with the longitudinal axis perpendicular to the longitudinal axis of said table, an upper chamber, and a lower chamber.

11. The apparatus of claim 10 wherein said upper chamber has two or more supports extending parallel to the longitudinal axis of said filler, said supports have a linear bearing to permit movement of said filler along said rails, said upper chamber contains a bladder and beneath said bladder a pressure plate, and said pressure plate fits snugly within said upper chamber.

12. The apparatus of claim 11 wherein said pressure source joins said upper chamber and when energized said pressure source fills said bladder thereby moving said pressure plate through the depth of said lower chamber ejecting the contents of said lower chamber through said grid into said cells.

13. The apparatus of claim 12 wherein said pressure source generates an intermittent impulse to eject soil from said upper chamber and into said cells.

14. The apparatus of claim 13 wherein said pressure source is selected from the group pneumatic, hydraulic, electric, vacuum, and mechanical.

15. The apparatus of claim 10 wherein said lower chamber joins beneath said upper chamber and has a grid that matches the desired cell pattern as the lower face of said lower chamber and a flap hinged along the side of said grid toward said lever, said flap having a knob.

* * * * *